Dec. 8, 1942.  A. W. NELSON  2,304,273
COMBINED DOCUMENT PHOTOGRAPHING AND ENDORSING MACHINE
Original Filed April 21, 1939  4 Sheets-Sheet 1

INVENTOR
Alexander W. Nelson,
BY
ATTORNEY

Dec. 8, 1942. A. W. NELSON 2,304,273
COMBINED DOCUMENT PHOTOGRAPHING AND ENDORSING MACHINE
Original Filed April 21, 1939 4 Sheets-Sheet 4

INVENTOR
Alexander W. Nelson,
BY
ATTORNEY

Patented Dec. 8, 1942

2,304,273

UNITED STATES PATENT OFFICE 2,304,273

COMBINED DOCUMENT PHOTOGRAPHING AND ENDORSING MACHINE

Alexander W. Nelson, Belleville, N. J.

Original application April 21, 1939, Serial No. 269,181, now Patent No. 2,235,844, dated March 25, 1941. Divided and this application March 20, 1941, Serial No. 384,373

19 Claims. (Cl. 88—24)

This invention relates to a combination paper feeding machine in which paper sheets or cards are taken up from a stack and fed, one at a time, into a mechanism for photographing, endorsing, or other processing of each sheet.

This invention also relates to a machine for endorsing or marking checks or like documents which are automatically fed, one document at a time, from a stack to the endorsing mechanism.

This invention also relates to a machine for photographing documents on one, or on both sides, that are taken up from a stack and fed to the photographing mechanism, one document at a time, by an automatic feeding mechanism.

This invention further relates to a machine in which the combined operation of endorsing and photographing checks, or like documents, taken up from a stack, one at a time, by an automatic feeding mechanism is carried out.

This invention also relates to a combined endorsing and photographing machine for checks and similar documents, which documents are fed to the machine, one at a time, by a sheet feeding mechanism and in which the operation of the endorsing mechanism may be suspended, or the operation of the photographing mechanism may be suspended.

An object of the invention is the provision of an endorsing or marking mechanism, operating in cooperation with a sheet feeding mechanism to mark or endorse each sheet passing through the machine.

Another object of the invention is to provide for receiving the document in one position from the sheet feeding mechanism in which one face of the document is photographed and then reversing the document and placing it in another position for photographing the other face, and to change over the photographing mechanism whereby documents of different sizes may be photographed.

A still further object of the invention resides in a combined sheet feeding mechanism, endorsing mechanism, and photographing mechanism, in which documents from the feeding mechanism are supplied to the endorsing mechanism and then to the photographing mechanism, with means for suspending the operation of the endorsing mechanism or the photographing mechanism in the cycle of operation.

Figs. 5 to 10, inclusive, is a diagram showing the relation of the cams on the control shaft;

Sheet feeding mechanism

The documents or sheets are placed in a stack upon a table and are suitably held under pressure by a weight or follower. Below the table a spider revolves carrying three spaced rollers thereon, which rollers are provided with rubber tired sections that engage the lowest sheet of the stack as the spider revolves. A planetary mechanism is provided for rotating these take-up rollers as the spider revolves, at a much higher surface speed than the speed of the spider, so that the take-up rollers engage the bottom sheet of the stack, rotating at a fairly high speed, and, at the same time, moving forward in the direction of the paper feed. This has the effect of snapping the bottom sheet from below the stack without producing any great tendency to move more than one sheet from the stack at a time. If the surface engagement between the take-up rollers and the bottom sheet were operated at a lower speed the tendency for one or more sheets above the bottom sheet to follow the bottom sheet into the feeder would be materially increased.

To insure that only one sheet may be fed forward for operation at a time, a hold-back mechanism is provided at the entrance to the paper guide which comprises one or more spring pressed rubber shoes which engage the back of the document as it leaves the paper stack, with less friction, however, than the friction of the take-up rollers, so that the bottom sheet of the stack is carried forward while any sheets that might follow the bottom sheet are retarded and held back by the hold-back mechanism.

In the drawings, 11 and 12 are the side plates of the mechanism which are suitably spaced by spacer bars indicated at 13. The paper table for the stack of documents is indicated at 14 and the frame of the endorsing mechanism 15, 15' is mounted on shaft 16 and comprises the inkwell 17, the inking rollers 18, 19, and the endorsing roller 20, which is provided with a collar 21 which engages the roller 23, mounted on shaft 24 and driven by the pinion gear 111, the idler gear 26 mounted on arbor 27 and engaging spur gear 28 mounted on shaft 29, and connected with the belt wheel 30, driven by belt 31.

Figures 3, 4:
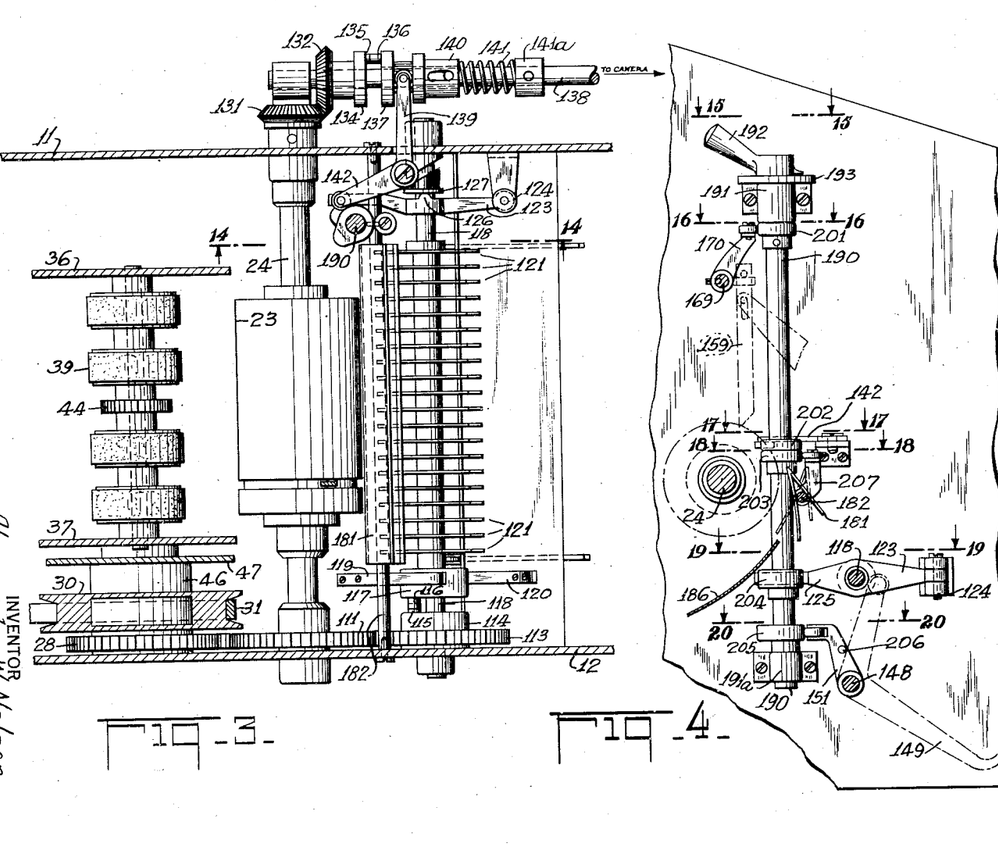
Fig. 3 is a horizontal section of the machine taken on line 13—13 of Fig. 2.
Fig. 4 is an elevation of the control shaft taken on line 14—14 of Fig. 3.

The shaft 29 is stationary and has the planetary gear 45 fastened thereto. A spider, comprising discs 36 and 37 is mounted on the shaft 29 so that it rotates freely on the fixed shaft 29. The spider comprises three sets of take-up rollers as indicated at 39, 40 and 41. These rollers are each mounted on shafts 42, rotating freely in the end plates 36 and 37, Fig. 3, of the spider and each shaft is provided with a spur gear 44, which engages the planetary gear 45 fixed on shaft 29.

The spider is driven from the belt wheel 30, through the collar 46 and the ratchet disc 47, mounted on the end plate 37 of the spider, so that the spider is rotated by the movement of the belt. The movement of the spider by the belt 31 rotates each of the take-up sets of rollers 39, 40 and 41 in the direction in which the spider is moving.

The stack of paper sheets is placed on the table 14 against the vertical guide 51 and on top of this stack the weighted follower 52a is placed to hold the sheets compressed together. The table 14 develops into guide fingers indicated at 53, Fig. 2. The hold-back shoe 62 is mounted in a head 65 which slides vertically and engages the back of the bottom sheet as it leaves the paper stack and enters the paper guide.

In the operation of the feeding spider each set of take-up rollers takes up and feeds forward one sheet from the bottom of the stack, that is, three sheets are fed for each rotation of the spider.

The paper feeding mechanism is described in detail in application Serial No. 269,181 filed April 21, 1939, now Patent 2,235,844, March 25, 1941, from which the present application is a division.

In the operation of this paper feeding mechanism a stack of paper sheets, such as bank checks or the like, is placed on the table 14 and the mechanism is started, being usually driven by an electric motor, not shown in the drawings. This rotates the spider frame 37 in the direction in which the paper sheets are fed into the paper guide 63, 179, and each set of take-up rollers projects from the frame of the spider like a rubber covered cam to engage the bottom sheet of the paper stack. The take-up rollers rotate with the spider frame at the same speed as the spider frame, but in addition to this they rotate on their own shafts, driven by the planetary gear so that their peripheral velocity is much greater than the peripheral velocity of the spider frame. This results in a snap action which releases and moves forward the lower sheet of the stack without producing any great tendency for the sheet immediately on top of the bottom sheet to follow it into the paper guide.

In order to further guard against feeding more than one sheet at a time the hold-back shoes 62 are provided to engage the back of the document that is carried forward by the feed rollers. These shoes are regulated by spring pressure and do not engage the sheet with the same friction as the feed rollers do, so that the sheet is carried forward in the paper guide, while any following sheets are engaged by these shoes and they are held from moving forward into the paper guide. The hold-back shoes are preferably applied to the paper sheets between the take-up rollers so that there is no contact and no frictional wear between these shoes and the take-up rollers.

Sheet feeding, endorsing and photographing mechanism

In the combination machine the paper feeding mechanism picks up and feeds one sheet at a time. The sheet is delivered to the endorsing mechanism for applying the mark thereto, then it is delivered to a paper holder in a first position where it is photographed on one side, after this the sheet is reversed and it is delivered to a second paper receiver below the first position where it is photographed on the opposite side, and after it is photographed in the last position it is released and drops into a receptacle.

When it is desired to use the machine for endorsing purposes only, the control shaft is adjusted for this operation which deflects the paper sheet as soon as it passes through the endorsing mechanism into a receptacle and the operation ends. When it is desired to photograph the sheet on both sides without applying the endorsing mark thereto the control shaft is adjusted for this operation which disconnects the trip of the endorsing mechanism making it inoperative and permitting the sheet to move into the first photographing position, and after it is photographed in this position it is reversed and moved into the second photographing position after which it is discharged.

When it is desired to photograph one side of the sheet only, which sheet may be larger than the sheets that are photographed on both sides, the endorsing mechanism is rendered inoperative by the control shaft and the reversing mechanism is also rendered inoperative and the first position in which the sheet is received is rendered inactive so that the sheet advances to the second position where it occupies the space corresponding to the first and the second positions of the smaller sheets and in this position it is photographed.

The camera is of the usual motion picture type with a shutter and film feed and is operated by a rotating shaft connected with a driven shaft of the mechanism. The camera photographs documents in the first and second positions on one frame of the film, or it photographs the larger documents on a single frame of the film. When the photographic mechanism is not used the drive of the operating shaft of the camera is disconnected.

When bank checks or similar documents are fed to the machine to be photographed on both sides the reversing receiver which receives the document in the first position is driven by the mechanism of the paper feed but in order to bring the document to rest in the photographing position and also in order to snap the paper sheet into the second position, a spring controlled cam is mounted on the shaft of the reverser and which accelerates its rotation preceding the time when the photographic exposure is made so that it comes to rest during the photographic exposure. This reverser is disconnected and moved to a neutral position when the larger document are to be photographed.

Figure 1:
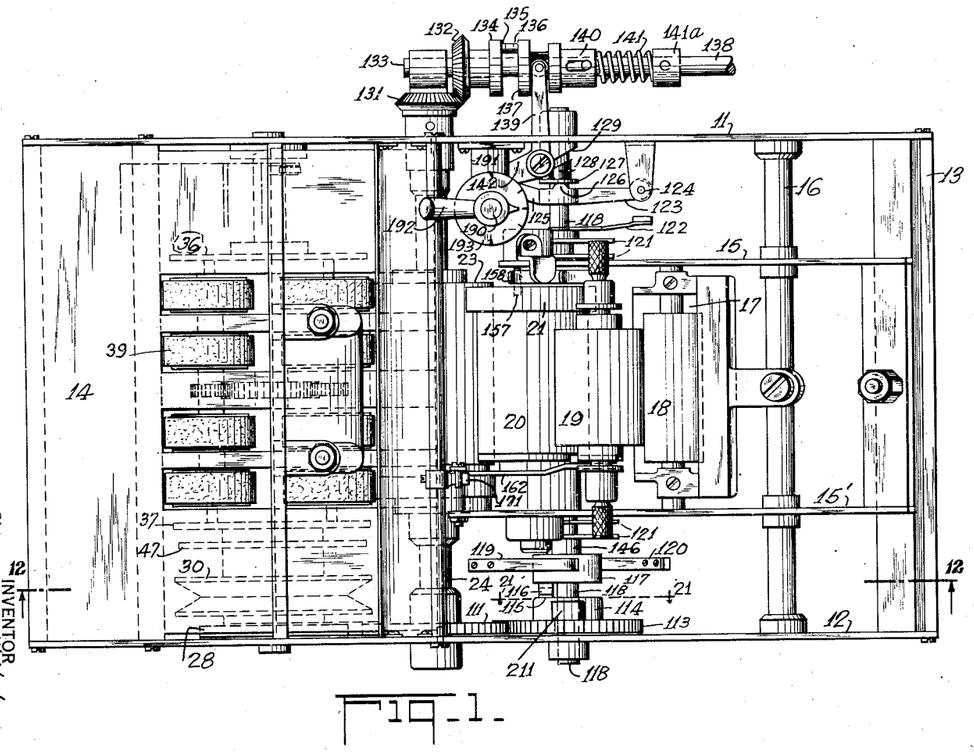
Fig. 1 is a top plan view of a combination sheet feeding machine, endorsing machine, and photographing machine.
Figure 2:
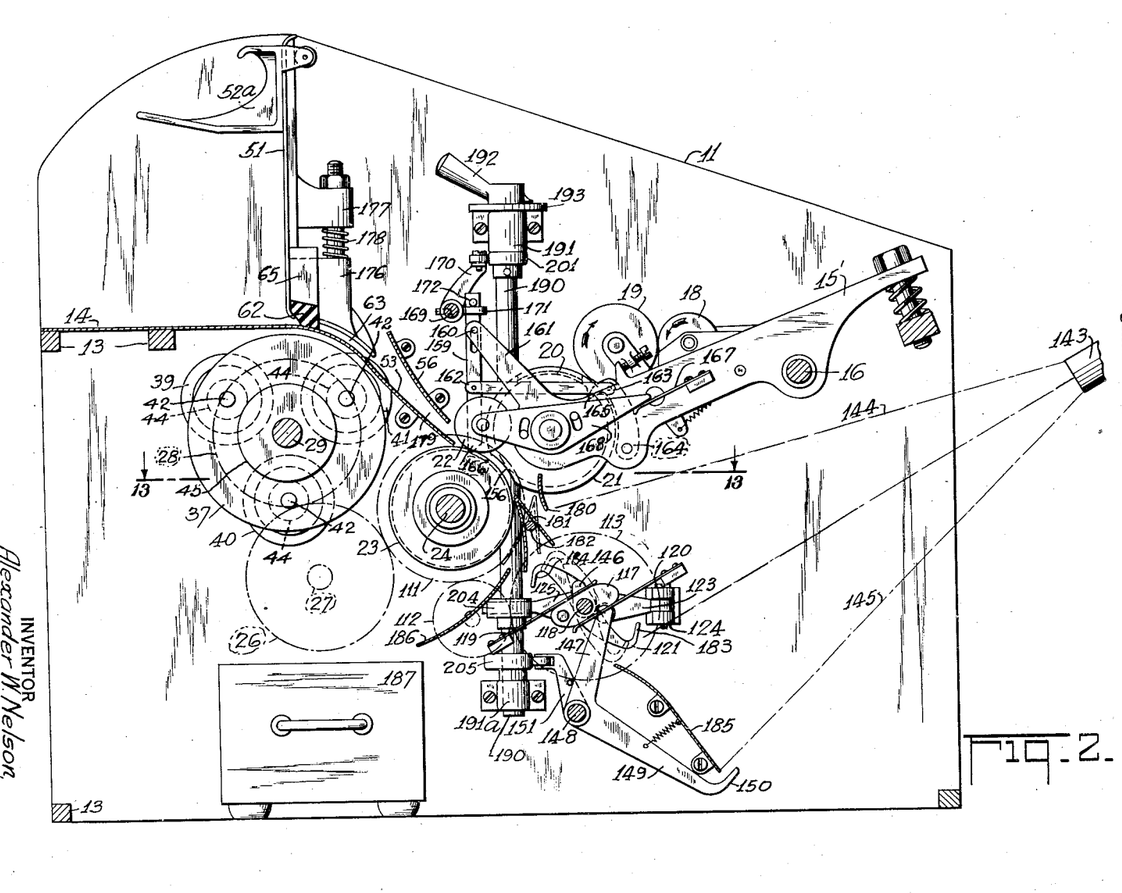
Fig. 2 is a side elevation on line 12—12 of Fig. 1, showing the combination machine.

In Fig. 1 and Fig. 2 the gear 111 on shaft 24 engages the idler gear 112 which drives gear 113, mounted loosely on shaft 118 of the reverser. Gear 113, with the hub 114, is provided with a pin 115, which engages pin 116 on the cam 117, fixed on shaft 118. Cam 117 moves between the flat springs 119 and 120 so that as gear 113 is rotated the pins 115 and 116, Fig. 1, engage and the cam 117 is driven forward to expand the springs 119 and 120 until the cam passes the dead centre, when it snaps forward in advance of the pin 115 and assumes the position shown in Fig. 2, with the hook 183 on the end of fingers 121, positioned to receive the sheet from the paper guide 181 where the edge of the sheet rests by gravity on the hook.

Lever 123, pivoted at 124, has a cam 126 engaging the disc 127 on shaft 118 and is provided with an arm 125 which, when raised, through disc 127, raises shaft 118 and disconnects the drive pins 115 and 116 and thereby disconnects the drive of shaft 118. When this disconnection takes place the inclined face of the cam 128, on shaft 118, engages the inclined face 129 of the bearing in frame 11; this partially rotates shaft 118 and brings the fingers 121 into a neutral position indicated in the dotted outline in Fig. 2. When the fingers are in this position the hook 183 is moved back into a position where it does not engage the paper sheet delivered from the guide 181, but instead the sheet moves forward to the second position on the guide 185 where it is stopped by its edge engaging the hook 150 on the lever 149.

The shaft 24 of roller 23, on the outside of frame 11, is provided with a bevel gear 131, which engages bevel gear 132 on shaft 133 on which the disc 134 is mounted. Disc 134 is provided with a pin 135 which engages pin 136 on disc 137 which is slidably mounted on shaft 138 and is normally held by the collar 141a, spring 141 and collar 140 in engagement, so that shaft 138 rotates with shaft 24 and operates the camera mechanism in cooperation with the paper feeding mechanism. The camera mechanism may be any commercial type and is not shown in the drawings.

Figures 6, 7, 8, 10, 11:
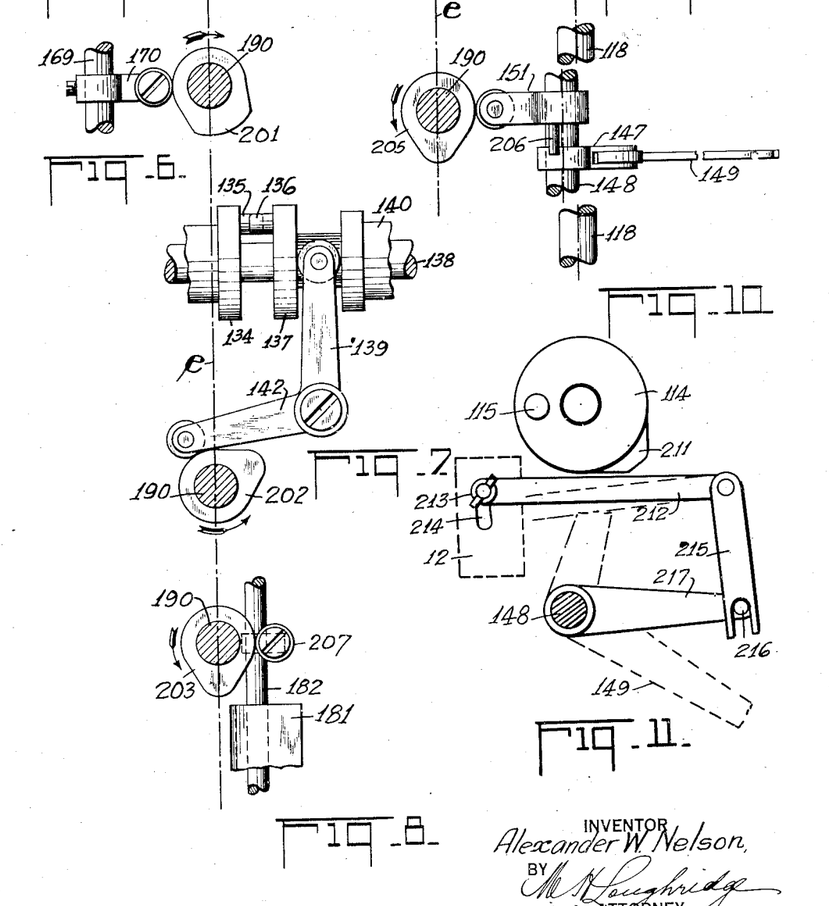
Fig. 6 is a view on line 16—16 of Fig. 4.
Fig. 7 is a view on line 17—17 of Fig. 4.
Fig. 8 is a view on line 18—18 of Fig. 4.
Fig. 10 is a view on line 20—20 of Fig. 4.
Fig. 11 is a section on line 21—21 of Fig. 1, showing the operation of the sheet releasing lever.
Figure 9:
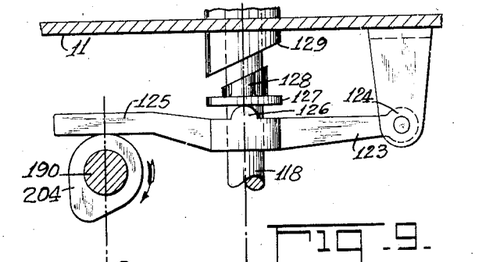
Fig. 9 is a view on line 19—19 of Fig. 4.

The driving engagement between the pins 135 and 136 is controlled by the crank arm 139 and arm 142, so that when arm 142 is raised, Fig. 7, the drive pins are disconnected and when the arm 142 is lowered the spring 141 re-establishes the drive. It should be noted that the drive between the discs 134 and 137, and also between 114 and 117, engage in a definite position in the rotation of the shafts so that after being disconnected the driving connection is re-established with the mechanism operating in proper sequence.

The shaft 118 is provided with a cam 146 which engages the arm 147, mounted on shaft 148 and having the depending arm 149 with the hook 150 arranged to engage the edge of the sheet and hold the paper in the final position for photographing purposes. A number of cranks corresponding to 149, may be provided on shaft 148 and this paper release is arranged to synchronize with the operation of the reverser shaft 118. An arm 151, pivotally mounted on shaft 148, is provided with a pin 206 which engages the arm 147 and may be used to move the hook 150 into an inoperative position.

The endorsing roller 20 is provided with a marking plate which is suitably inked by the ink rollers 18 and 19 and this roller is intermittently rotated to mark the document as it passes between roller 20 and roller 23. For this purpose the roller 20 is provided with a collar 21 which frictionally engages roller 23 and is rotated thereby, but the collar 21 is cut away at 156, leaving a space between this collar and roller 23 which stops the rotation of the endorsing roller 20. In order to start the endorsing roller a trip is provided which is operated by the entering edge of the paper sheet as it is moved forward between roller 22 and roller 23, roller 22 being held in spring engagement with 23 by the mounting plate 168 and the spring 167.

The paper from the guide 53 engages the lower end 166 of the lever 159, pivoted at 160 in the arm 161 and moves the lever 162, connected to 159, to the right as indicated at Fig. 2, thereby releasing the latch 164 from the notch 165 in the roller 20. When the latch is released the flat spring 158, which rests upon the pin 157, in the collar 21 of the roller 20, Fig. 1, gives this roller an initial forward movement so as to bring the engaging portion 21 of the collar on roller 20 into engagement with roller 23 and thereby insuring one revolution of the endorsing or marking roller, which applies the mark to the sheet as it passes over roller 23. When the roller 20 completes a revolution it is again latched by 164 and it remains in the latched position until the latch is tripped by a following sheet. In this way the endorsing mechanism is controlled by the movement of the sheet itself. The lever 159 has a slotted connection with the pivot pin 160 in arm 161 and is provided with a pin at the top 172, which is engaged by the arm 171, mounted on shaft 169, which shaft is rotated by the arm 170 to lift the lever 159 so that the end 166 does not engage the paper sheet, thereby rendering the endorsing mechanism inoperative.

The paper sheets are placed in a stack on the table 14, against the guide 51, and are compressed by the follower 52a, sliding on guide 51. The sheets are taken up by the rotation of the spider 37, with the take-up rollers 39, 40 and 41 engaging the bottom sheet of the stack and moving it into the paper guide 63, below the hold-back shoe 62, mounted on the guide 65. The paper slot 63 is regulated by the guide 176, sliding vertically in the support 177 and held in the down position by the spring 178. The paper sheet passes between the guides 53 and 56 into the passage 179 and between the roller 22 and the roller 23.

When the paper sheet leaves the roller 23 it passes between the fixed paper guide 180 and the movable paper guide 181 and over the fingers 121, mounted on shaft 118, where it is received in the first position with its lower edge engaging the hook 183. The shaft 118 makes one-half turn for each sheet delivered so that when it rotates into the next position the hook 184 is brought into the position of hook 183 to receive the next sheet.

Paper guide 181 is mounted on shaft 182 which shaft is rotated by the arm 207, Fig. 8, so that in one position the paper guide 181 delivers the paper sheet to the fingers 121, and in another position the paper guide 181 is moved to the position indicated in dotted outline which deflects the paper from roller 23 to the fixed guide 186 and to the paper receptacle 187. In this case the paper is deflected from the photographing mechanism after it has passed through the endorsing mechanism into the receptacle 187.

The operation of the mechanism is controlled by the cam shaft 190, which is mounted on the bearings 191 and 191a and is provided with an operating handle 192 and an indexing disc 193 for indicating the various operations set up. The operation of the control shaft and the relation of the cams thereon is indicated in Figs. 5 to 10, inclusive, in which the axis of the cam shaft is indicated by the line e. Cam 201 engages the arm 170 and rotates shaft 169 to raise the lever 159 and render the endorsing mechanism inoperative. Cam 202 engages the crank arm 142 and disconnects the drive between pins 135 and 136 of shaft 138 which operates the camera 143. Cam 203, through arm 207, rotates shaft 182 and thereby deflects the paper guide 181 to by-pass the photographing apparatus and deliver the sheets to the receptacle 187. Cam 204 engages lever 125 to raise the shaft 118 against spring 122 and disconnect the drive of this shaft so that the fingers 121 remain stationary and are moved into the inactive position shown in dotted outline in Fig. 2. Cam 205, through arm 151, loosely mounted on shaft 148, by pin 206, engages arm 147, which moves the hook 150 into the inactive position.

*Operation*

Figure 5:
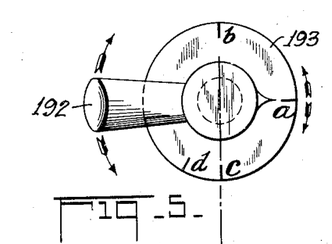
Fig. 5 is a view on line 15—15 of Fig. 4.

With the handle 192 in the position shown in Fig. 5, with the indicator at a, the apparatus may be assumed to be in the normal position in which all the cams are inactive. This leaves the lever 159 in position to engage the paper at 166 so that the endorsing mechanism is brought into operation; the shaft 182 is provided with a spring bias, not shown in the drawings, which places the paper guide 181 in position to deliver the paper sheet to the fingers 121. The spring 141 connects the camera shaft 138 with the shaft 24 so that the camera is operated as the roller 23 rotates. The shaft 118, with the cam 117 is driven by the engagement of pins 115 and 116 to rotate with shaft 24 so that the paper sheet is delivered to these fingers and held in place by the hook 183, thus one face of the document is brought into the focal plane of the camera 143 defined by the lines 144 and 145. The cam 205 is in the inactive position so that arm 149 is operated by cam 146 on shaft 118. The first sheet taken up by the sheet feeding mechanism 37, from the table 14, is thus passed through the endorsing mechanism and then to the first photographing position where it is photographed.

The continued rotation of the shaft 24 of the sheet feeding mechanism rotates shaft 118 and the fingers 121 for part of a revolution until the dead centre of cam 117 is passed, when these fingers snap into the position shown in Fig. 2, in advance of the hub 114; at the same time the hook 183 is released from holding the sheet and the upper end of the fingers turn the sheet over or reverses it while it slides down on the guide 185 to be engaged by the hook 150 in the second photographing position. While this operation is taking place another sheet is delivered to the fingers 121 and is engaged by the hook 184, now in the lower position. This exposes the front side of a check or document in the first position and the back side of the previous document in the second position and these documents are photographed together on the same frame of the film. It should be noted that while the mechanism continues to rotate, including shaft 118, that the fingers 121 have a period of rest due to the accelerated movement caused by cam 117 and during this period of rest the camera exposure is made. In this operation the documents are automatically fed to the endorsing mechanism and from the endorsing mechanism to the photographing mechanism where they are photographed first on one side and then reversed and photographed on the opposite side. After the final photograph the arm 149 is moved by cam 146 to release the document and deliver it to a suitable receptacle.

When the handle 192 is rotated to bring the indicator opposite point b the cam 201 remains inactive so that the endorsing mechanism is in the operative position; cam 202 operates crank arm 142 to disconnect the camera drive so that the photographic mechanism is inactive; cam 203 operates the paper guide 181 to deflect the documents from the endorsing mechanism into the receptacle 187, thereby by-passing the photographic mechanism. Cam 204 remains inactive so that shaft 118 is rotated idly while cam 205, thru arm 151 and pin 206 moves the arm 147 away from cam 146 so that the arm 149 is in an inactive position.

When the handle 192 is rotated to bring the indicator to the position c, cam 201 engages arm 170 and through shaft 169 raises the trip lever 159 and renders the endorsing mechanism inoperative. Cam 202 is inactive so that the camera drive shaft 138 rotates with shaft 24. Cam 203 is inactive so that the paper guide 181 remains in the normal position to deliver the documents to the fingers 121, and cams 204 and 205 remain inactive. In this position the endorsing mechanism is rendered inactive while the paper feeding mechanism takes up the sheet from the bottom of the stack and delivers it to the fingers 121 where it is photographed on one side, then the sheet is reversed and delivered to the second photographing position and finally is discharged by the arm 149. In this way the photographing mechanism is operated independently of the endorsing mechanism.

When the handle 192 is rotated to bring the index pointer to the position indicated at d, the cam 201 remains in engagement with arm 170, thereby rendering the endorsing mechanism inactive, cams 202 and 203 remain inactive so that the camera shaft 138 operates the shaft 24 and the paper guide 181 is positioned to deliver the paper sheets to the photographing mechanism. Cam 204 is brought into engagement with lever 125 which raises shaft 118, thereby disconnecting the drive of the shaft and, at the same time, moving the fingers 121 into the inactive position shown in dotted outline in Fig. 2. The paper sheet is now delivered to the table 185 and against the hook 150. In this case the paper sheets may be bank statements or other documents larger than checks which may occupy the space represented by the first and second photographing positions of the smaller documents and within the focus of the camera indicated by lines 144 and 145. In this case the larger document is photographed on one side only and on a single frame of the film.

When the shaft 118 is disconnected from the drive the cam 146 ceases to operate releasing crank 149. This release may be operated by the hub 114, as indicated in Fig. 11, through the cam 211, engaging lever 212, pivoted at 213 and connected by link 215 by a slotted connection to the pin 216 on lever 217, mounted on shaft 148 upon which the releasing lever 149 is mounted. Each rotation of 114 depresses lever 217 and moves 149 to the released position. This mechanism is rendered inoperative by moving the pivot 213 to the lower position in slot 214 in the side plate 12.

The paper feed mechanism 37 when used with smaller documents like checks takes up one check from the paper stack for each set of rollers 39, 40 and 41. When the documents are approximately twice the width of the checks the paper sheet is engaged by two sets of take-up rollers at the same time, the first set engaging the front end of the sheet and the second set engaging the rear end. This means that when the long sheets are used only half the number of sheets are fed to the mechanism in the same period of time that the shorter sheets are fed in. This enables the camera to be operated at the same speed for both the small and the large documents.

The paper feeding mechanism may be used for feeding paper sheets one at a time to any kind of mechanism and the photographing system may be used for photographing documents on one or on both sides delivered to it either manually or from any type of feeding mechanism.

Having thus described my invention, I claim:

1. A document endorsing and photographing machine comprising a drive, a feeding mechanism operated by said drive and feeding documents one at a time, a guide for receiving the document from said feeding mechanism, an endorsing mechanism comprising a pair of engaging rollers driven by said drive and receiving the document from the paper guide and applying the endorsing mark thereto, a photographing system comprising a shaft with a member thereon extending in diametrically opposite directions from said shaft and having a hook at the end of one extension facing in one direction, and a hook at the end of the opposite extension facing in the other direction, said hooked member being located in the path of the document to engage the edge of the document as it is discharged from said rollers and means connected with said drive for rotating said shaft one-half turn for each document to discharge the document from one set of hooks and to position the other set for receiving the next document.

2. A document endorsing and photographing machine comprising a drive, a feeding mechanism operated by said drive and feeding documents one at a time, a guide for receiving the document from said feeding mechanism, an endorsing mechanism comprising a pair of engaging rollers driven by said drive and receiving the document from the paper guide and applying the endorsing mark thereto, a camera, a photographic system comprising a shaft with a member thereon located in the path of the document as it is discharged from said rollers, hooks on said member engaging the edge of the document by gravity and positioning it in the field of said camera, means rotating said shaft by said drive and means for holding said shaft at rest during the time the exposure is made.

3. A document endorsing and photographing machine comprising a drive, a feeding mechanism operated by said drive and feeding documents one at a time, a first paper guide for receiving the document from said feeding mechanism, an endorsing mechanism comprising a pair of engaging rollers driven by said drive and receiving the document from the first paper guide and applying a mark thereto, a second paper guide receiving the document from said rollers after the endorsing operation, a photographing system comprising a pivoted holder for receiving the document from the second paper guide and holding it in position to be photographed, and means for adjusting said second paper guide to deflect the document from the photographing system while the endorsing mechanism is operative.

4. A document endorsing and photographing machine comprising a drive, a feeding mechanism operated by said drive and feeding documents one at a time, a guide for receiving the document from said feeding mechanism, an endorsing mechanism comprising a pair of engaging rollers driven by said drive and receiving the document from the paper guide and applying the endorsing mark thereto, a trip engaged by the document for bringing said endorsing mechanism into operation, a photographing system comprising a pivoted holder for receiving the document from said rollers and holding it in position to be photographed and means for removing said trip from the path of the document to prevent the application of said endorsing mark while the photographic system is in operation.

5. A combination sheet-feeding, endorsing and photographing machine, comprising a drive, a feeding mechanism operated by said drive, feeding one sheet at a time; an endorsing mechanism receiving the sheet from said feeding mechanism and comprising a pair of rollers driven by said drive for marking the document, a photographing mechanism comprising a camera and a holding mechanism operated by said drive for receiving the document as it leaves said endorsing mechanism and holding it in position to be photographed, said drive operating said holding mechanism to discharge the document and condition it for receiving another document, and a cam shaft for adjusting said machine to suspend the photographic operation while the endorsing mechanism is in operation.

6. A document endorsing and photographing machine comprising a drive, a feeding mechanism operated by said drive and feeding documents one at a time, a guide for receiving the document from said feeding mechanism, an endorsing mechanism comprising a pair of engaging rollers driven by said drive and receiving the document from the paper guide and applying the endorsing mark thereto, a photographic system comprising a camera, and a holding mechanism for holding the document in the field of the camera, means operated by said drive for operating said holding device to reverse the document in the field of the camera whereby both sides may be photographed and a cam shaft adjusting said mechanism to suspend operation of said endorsing mechanism while the photographic mechanism is operative and to suspend the reversing operation of said holding device to photograph one side of the document only.

7. A document endorsing and photographing machine comprising a drive, a feeding mechanism operated by said drive and feeding documents one at a time, a guide for receiving the document from said feeding mechanism, an endorsing mechanism comprising a pair of engaging rollers driven by said drive and receiving the document from the paper guide and applying the endorsing mark thereto, a photographing system comprising a camera, a shaft having projections thereon engaging the document to hold it in the field of the camera, a second means normally inactive, for holding the document in the field of the camera, means operated by said drive for operating said shaft to reverse the document, means for holding the document in a second photographic position, and a cam shaft adjusting said mechanism to place said shaft in an inactive position, to suspend the operation of said endorsing mechanism and to bring the second holding means into operation while the photographic system is operative.

8. A combination sheet-feeding, endorsing and photographing machine, comprising a drive, a feeding mechanism operated by said drive, feeding one sheet at a time; an endorsing mechanism receiving the sheet from said feeding mechanism and comprising a pair of rollers driven by said drive for marking the document, a photographic mechanism comprising a camera and a holding mechanism for holding the document in the field of the camera, means operated by said drive for operating said holding mechanism to reverse the document, a cam shaft adjusting said machine and when in a first position setting the machine for endorsing the document on one side and for photographing it on both sides, when in a second position, setting the machine to suspend the endorsing operation while photographing the document on both sides, and when in a third position setting the machine to photograph the document on one side only.

9. A combination sheet-feeding, endorsing and photographing machine, comprising a drive, a feeding mechanism operated by said drive, feeding one sheet at a time; an endorsing mechanism receiving the sheet from said feeding mechanism and comprising a pair of rollers driven by said drive for marking the document, a photographic mechanism comprising a camera and a holding mechanism for holding the document in the field of the camera, means operated by said drive for operating said holding mechanism to reverse the document, a cam shaft adjusting said machine and when in a first position setting the machine for endorsing the document on one side and for photographing it on both sides, when in a second position, setting the machine to suspend the endorsing operation while photographing the document on both sides, and when in another position setting the machine to endorse the document while suspending the photographic operation.

10. A combination sheet-feeding, endorsing and photographing machine, comprising a drive, a feeding mechanism operated by said drive, feeding one sheet at a time; an endorsing mechanism receiving the sheet from said feeding mechanism and comprising a pair of rollers driven by said drive for marking the document, a trip lever engaging the document for operating the endorsing mechanism for each document, an adjustable paper guide receiving the document as it leaves said rollers, a photographing mechanism receiving the document from said paper guide and a cam shaft operating said trip lever to render said endorsing mechanism operative, and adjusting said paper guide to deflect the document away from the photographic mechanism while the endorsing mechanism is in operation.

11. A document feeding and photographing system, comprising a drive, a sheet feeding mechanism, feeding one sheet at a time, operated by said drive, a photographing system comprising a camera, a document holding mechanism receiving the document from said feeding mechanism and holding it in the field of said camera, said holding mechanism comprising a shaft, members mounted on and projecting from said shaft and diametrically opposed, means on said members when said members are in one position located in the path of said document and engaging its edge to hold the document in place to be photographed, means for rotating said shaft by said drive to disengage the document from said members by gravity and means for arresting the movement of said shaft during the exposure of the camera.

12. A document feeding and photographing system, comprising a drive, a sheet feeding mechanism feeding one sheet at a time operated by said drive, a photographing system comprising a camera, a document holding mechanism receiving the document from said feeding mechanism and holding it in the field of said camera, said holding mechanism comprising a shaft, members mounted on and projecting from said shaft, means on said members in one position located in the path of said document to hold the document in place to be photographed, means for rotating said shaft at a normal speed by said drive and a spring controlled cam on said shaft accelerating the rotation of said shaft over the drive preceding the exposure of the camera whereby its rotation is retarded during the exposure.

13. A document feeding and photographing system comprising a drive, a sheet feeding mechanism feeding one sheet at a time, operated by said drive, a photographing system comprising a camera, a document holding mechanism receiving the document from said feeding mechanism and holding it in the field of said camera, said holding mechanism comprising a shaft, members on said shaft having means located in one position in the path of said document engaging its edge by gravity to hold the document in a first position, a second document holding mechanism for holding the document by gravity in the field of the camera adjacent the first holding position and means for rotating said shaft by said drive to reverse the document and deliver it from the first holding position to the second holding position.

14. A document feeding and photographing system comprising a drive, a sheet feeding mechanism feeding one sheet at a time, operated by said drive, a photographing system comprising a camera, a document holding mechanism receiving the document from said feeding mechanism and holding it in the field of said camera, said holding mechanism comprising a shaft, members on said shaft in one position located in the path of the document engaging its edge by gravity to hold the document in a first position in the field of the camera, members on said shaft, when rotated one-half turn, holding the document by gravity also in the first photographic position, a second holding mechanism holding the document by gravity in the field of the camera in a position adjacent to the first holding position and means for rotating said shaft by said drive one-half turn for each document to reverse the document and deliver it to the second holding position.

15. A document feeding and photographing system comprising a drive, a sheet feeding mechanism feeding one sheet at a time, operated by said drive, a photographing system comprising a camera, a document holding mechanism receiving the document from said feeding mechanism and holding it in the field of said camera, said holding mechanism comprising a shaft, members on said shaft in one position located in the path of the document to hold the document by gravity in a first position in the field of the camera, members on said shaft, when rotated one-half turn, holding the document also in the first photographic position by gravity, a second holding mechanism holding the document by gravity in the field of the camera in a position adjacent to the first holding position, means for rotating said shaft by said drive one-half turn for each document to reverse the document and deliver it to the second holding position and means operated by said drive for releasing the document by gravity from the second holding position.

16. A document feeding and photographing system comprising a drive, a sheet feeding mechanism feeding one sheet at a time operated by said drive, a photographing system comprising a camera, a first document holding mechanism receiving the document from said feeding mechanism and holding it in the field of the camera, a second holding mechanism adjacent said first holding mechanism in the field of the camera, means on said first holding mechanism engaging the document as it is released from the feeding mechanism, a shaft for said first holding mechanism operated by said drive to deliver the document from the first holding mechanism to the second holding mechanism and means for disconnecting the drive of said shaft and moving said first holding mechanism into an inactive position to deliver the document to the second position from the feeding mechanism.

17. A document feeding and photographing system comprising a drive, a sheet feeding mechanism feeding sheets one at a time, operated by said drive, a photographing system comprising a camera, a first document holding mechanism receiving the document from said feeding mechanism and holding it in the upper portion of the field of the camera, a second holding means holding the document in the lower portion of the field of the camera, means on said first holding mechanism engaging the document as it is released from the feeding mechanism, a shaft for said first holding mechanism operated by said drive to reverse the document and deliver it from the first holding position to the second holding position and a cam shaft for disconnecting the drive of said shaft and moving the first holding mechanism in an inactive position to deliver the document to the second position to be photographed in both the upper and lower field of the camera.

18. A document photographing system comprising a mechanism for feeding the document into the field of the camera, a first means for positioning the document to photograph it on one side, a second means for reversing the document and locating it in a position adjacent the first position to photograph the opposite side and means for rendering said positioning means inactive and a third positioning means controlled by the last named means for positioning the document to occupy the first and second positions at the same time.

19. A document photographing system comprising a motion picture camera, a mechanism for feeding the document into the field of the camera, a first positioning means for locating the document to be photographed on one part of a frame of the film, a second positioning means for locating the document to be photographed on the other part of the frame of the film, a third positioning means for locating the document to be photographed by the entire frame of the film, and means for bringing the third means into operation and for discontinuing the first and second means.

ALEXANDER W. NELSON.